United States Patent [19]
Atkins

[11] Patent Number: 5,655,524
[45] Date of Patent: Aug. 12, 1997

[54] AIR REGULATOR HAVING A SLOTTED PISTON

[76] Inventor: Charles L. Atkins, 6828 Despot St., Shreveport, La. 71108

[21] Appl. No.: 438,647

[22] Filed: May 10, 1995

Related U.S. Application Data

[63] Continuation of Ser. No. 102,945, Aug. 4, 1993, abandoned.

[51] Int. Cl.$^6$ .............. A61M 16/00; A62B 7/04; A62B 9/02; F16K 31/26
[52] U.S. Cl. .............. 128/205.24; 128/204.26; 137/505.25
[58] Field of Search .......... 128/201.28, 204.26, 128/205.24; 137/505.25, 510, 882, 883, 881, 878

[56] References Cited

U.S. PATENT DOCUMENTS

| | | | |
|---|---|---|---|
| 3,698,425 | 10/1972 | Fisher | 137/505.25 |
| 3,706,477 | 12/1972 | Stelzer | 137/505.25 X |
| 3,714,941 | 2/1973 | Kipling | 128/205.24 |
| 4,436,090 | 3/1984 | Darling | 128/204.26 |
| 4,723,725 | 2/1988 | Comment | 239/533.1 |
| 4,889,115 | 12/1989 | Bozano | 128/204.26 |
| 5,038,770 | 8/1991 | Perkins | 128/204.18 |
| 5,052,383 | 10/1991 | Chabert | 128/204.26 |
| 5,176,169 | 1/1993 | Ferguson | 137/454.5 |
| 5,190,030 | 3/1993 | Semeia | 128/204.26 |
| 5,213,132 | 5/1993 | Comment | 137/505.25 |

Primary Examiner—Kimberly L. Asher
Attorney, Agent, or Firm—John M. Harrison

[57] ABSTRACT

A first-stage air regulator for diving apparatus which is designed to reduce high tank air pressures to air pressures more compatible with normal breathing. The air regulator includes a cylindrical regulator housing containing a sliding piston which is provided with air slots adapted for transiently establishing air flow from a high-pressure air chamber contained in one end of the housing to an intermediate-pressure air chamber adjacent to the high-pressure air chamber. The air within the intermediate-pressure chamber equilibrates with pressure applied to the piston by a spring and ambient water pressure, before passing to a second-stage air regulator and mouthpiece by means of an air hose. Additionally, air can be transferred from the intermediate-pressure chamber to accessories such as a lift bag, a power inflator or a blow gun, through corresponding air hoses.

13 Claims, 1 Drawing Sheet

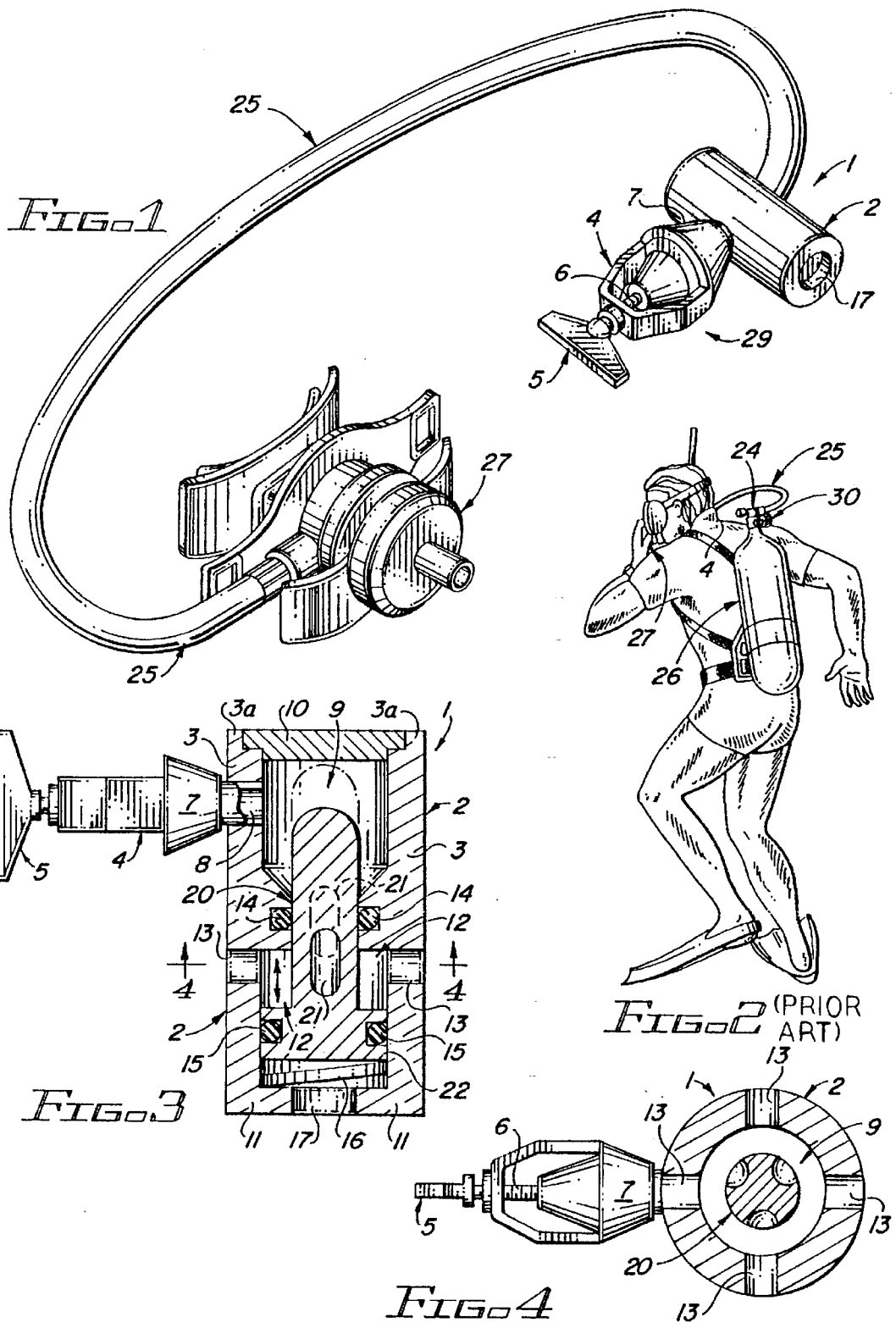

AIR REGULATOR HAVING A SLOTTED PISTON

This is a continuation of application Ser. No. 08/102,945, filed on Aug. 4, 1993, now abandoned.

BACKGROUND OF THE INVENTION

1. Field of the Invention

This invention relates to air regulators for use in diving apparatuses, and more particularly, to a first-stage air regulator characterized by a regulator housing containing a sliding piston which is provided with air slots positioned for transiently establishing air flow from a high-pressure air chamber, which is provided in one end of the housing, to an intermediate-pressure air chamber. The high-pressure air chamber receives air from a high-pressure air tank and transfers the air at reduced pressure to the intermediate-pressure air chamber, which distributes air through an air delivery hose to a second-stage regulator and mouthpiece. In a preferred embodiment air can additionally be distributed from the intermediate-pressure chamber to accessory items such as a lift bag, power inflator or a blow gun, through corresponding hoses.

Most conventional air pressure reduction regulators include a first stage for reducing air pressure from an air tank and moving air to a second-stage regulator, which feeds the air into a mouthpiece for breathing on demand by the user. One of the problems inherent in conventional first-stage regulators is wearing of the piston sealing surfaces and piston housing, thereby decreasing longevity of the apparatus. In these regulators the piston-end situated within the high-pressure chamber is flat and is forced up into a piston seat contained within the interior side of the housing wall. Long-term use of the regulator results in wearing of the piston-end and housing wall. The present invention reduces this problem by utilizing a rounded piston-end which contacts the housing wall in a correspondingly smaller surface area than that observed in conventional regulators, resulting in smoother operation and greater longevity of the apparatus. Additionally, in the present invention, that portion of the housing wall which is contacted by the piston-end is modified to define a housing cap which is threaded or otherwise fits into the regulator housing and can be removed for replacement of the worn housing cap itself or replacement of a worn piston, or both.

2. Description of the Prior Art

Various devices have been devised for directing a breathing gas from a storage tank to a breather apparatus. U.S. Pat. No. 3,714,941, dated Feb. 6, 1973, to Barry J. Kipling, details a "Medical Respirator" characterized by a gas container divided into two volumes by a movable member. Gas for the patient is expelled from a variable first volume by movement of the member, responsive to an increasing volume of patient gas flowing into the second volume. A switch controls the time-flow of gas from the respirator to the patient. U.S. Pat. No. 4,436,090, dated Mar. 13, 1984, to Philip H. Darling, describes a "Piston-Acutated, Pilot Valve-Operated Breathing Regulator" for use in a resuscitator or respirator. The breathing regulator includes a pressure-responsive piston which provides an outlet for exhalation and acts directly on a valve seat to open a pressurized gas pilot valve during inhalation. The piston is moved to open the pilot valve by inhalation suction, while a one-way valve automatically blocks the exhalation path during inhalation. U.S. Pat. No. 4,889,115, dated Dec. 26, 1989, to Enrico D. Bozano, discloses an "Air Regulator For Breathing Apparatus" characterized by the second stage of a regulator, including a first airflow circuit controlled by a monostat diaphragm which permits the flow of the minimum required amount of air upon each act of breathing, with minimum effort, and a second airflow circuit combined with the first circuit which operates to supply a supplementary amount of air to meet any additional need of the user. U.S. Pat. No. 5,038,770, dated Aug. 13, 1991, to Warren E. Perkins, discloses "Fail-Safe Systems for Respirating Gas Delivery Devices" for use with pulse dose respirating gas delivery devices to provide a continuous, metered flow of oxygen to a patient in the event of delivery device malfunction or a power failure. A piston is resiliently biased near one end of a cylinder and is adapted for receiving the force of pressurized gas in opposition to the biasing force of the piston and in synchronization with doses of respirating gas produced by the delivery device. That force is subsequently removed in coordination with the delivery of a gas dose to the patient. U.S. Pat. No. 5,052,383, dated Oct. 1, 1991, to Jean-Marie Chabert, describes a "Device for Supplying Breathing Gas to a Diver". A pressure-reducing valve is opened and closed by a piston actuated by an extended rod, the end of which is coupled to an articulated control lever which driven by a diaphragm. By increasing the distance from the articulated lever through the rod to the pressure-reducing valve, the risk of icing caused by cooling energy generated at the pressure-reducing valve when the diver operates in very cold water, is eliminated.

It is an object of this invention to provide a new and improved, first-stage air regulator which is characterized by a piston slidably accommodated between a high-pressure air chamber and an intermediate-pressure air chamber contained within a cylindrical housing, the piston being provided with air slots which are adapted for transiently passing air from the high-pressure chamber to the intermediate-pressure chamber, where the air equilibrates with pressure applied to the piston by a spring and by the ambient water pressure and is then passed to a second-stage air regulator through an air hose.

Another object of the invention is to provide an air regulator for reducing air pressure flowing from an air tank to the mouthpiece of diving equipment, which air regulator includes a slotted piston having a rounded end and slidably mounted in a housing between a high pressure chamber and an intermediate pressure chamber, wherein air at high pressure is allowed to flow through the slots in the piston when the slots communicate with both the high-pressure chamber and the intermediate-pressure chamber and the air pressure in the intermediate pressure chamber balances spring and ambient water pressure exerted on the piston to facilitate air flow into the mouthpiece.

SUMMARY OF THE INVENTION

These and other objects of the invention are provided in a new and improved first-stage air regulator for a diving apparatus, which air regulator includes a cylindrical regulator housing slidably accommodating a piston provided with air slots suitably adapted for transiently establishing air communication between a high-pressure air chamber provided within one end of the housing and an intermediate-pressure air chamber adjacent to the high-pressure air chamber, the intermediate-pressure chamber air equilibrating with spring pressure plus ambient water pressure applied to the piston, before passing to a second-stage air regulator and mouthpiece by means of an air hose.

BRIEF DESCRIPTION OF THE DRAWING

The invention will be better understood by reference to the accompanying drawing, wherein:

FIG. 1 is a perspective view of the air regulator of this invention, illustrating attachment of the air regulator to a mouthpiece enclosing a second-stage regulator by means of an air hose;

FIG. 2 is a perspective view of a conventional air regulator, illustrating attachment of the regulator to a "G" valve mounted on an air tank carried by a diver;

FIG. 3 is a longitudinal sectional view of the air regulator illustrated in FIG. 1; and FIG. 4 is a cross-sectional view of the air regulator of this invention, taken along section line 4—4 in FIG. 3.

DESCRIPTION OF THE PREFERRED EMBODIMENTS

Referring initially to FIGS. 1 and 2 of the drawing, the air regulator of this invention is generally illustrated by reference numeral 1 and includes a conventional housing yoke 4, which may be a standard yoke fitting for U.S. use, or a DIN fitting for European use, mounted to the side of the air regulator 1. As further illustrated in FIG. 2, the housing yoke 4 of a conventional air regulator 30 is attached to the "G" valve 24 of an air tank 26 and thus secures the conventional air regulator 30 to the air tank 26, and also establishes air flow from the air tank 26 to the conventional air regulator 30. An air delivery hose 25 connects the air regulator 1 to a second-stage regulator (not illustrated) in a mouthpiece 27.

Referring now to FIGS. 1, 3 and 4, the air regulator 1 includes a cylindrical regulator housing 2, with a housing wall 3 defining a threaded wall shoulder 3a and a high-pressure chamber 9 contained within the upper end of the air regulator 1. An intermediate-pressure chamber 12 is contained within the central area of the air regulator 1. A removable housing cap 10, enabling maintenance of inside parts of the air regulator 1, is threaded into the upper end of the regulator housing 2 at the wall shoulder 3a by means of internal threads which encircle the interior of the wall shoulder 3a and interlock with external threads encircling the exterior circumference of the housing cap 10. The conventional housing yoke 4, mounted to or shaped integrally with the housing wall 3 at a yoke base 7, includes a yoke bolt 5, threaded into the housing yoke 4 by means of bolt threads 6. An air entry port 8, provided in the housing wall 3 adjacent to the yoke base 7, facilitates air flow from the air tank 26 into the high-pressure chamber 9 when the housing yoke 4 is mounted on a conventional "G" valve 24, as illustrated in FIG. 2. A piston 20, characterized by an enlarged piston base 22, which is concentric with the bore of the intermediate-pressure chamber 12, is slidably accommodated within the air regulator 1 and includes at least one, but preferably three elliptical, equally-spaced air access slots 21, circumferentially arranged in the sides of the piston 20 above the piston base 22. The rounded upper end of the piston 20 reposes within the high-pressure chamber 9, while the piston base 22 reposes within the intermediate-pressure chamber 12. A piston sealing ring 14 is mounted within the housing wall 3 and encircles the piston 20, substantially sealing high-pressure air within the high-pressure chamber 9 from intermediate-pressure air within the intermediate-pressure chamber 12. Four air exit ports 13 are provided in spaced relationship in the housing wall 3, for purposes which will be further hereinafter described. A piston base sealing ring 15, similarly mounted in the piston base 22, prevents water from an ambient pressure port 17 from leaking into the intermediate-pressure chamber 12. A piston spring 16 is seated in the base of the housing wall 3 inside the housing flange 11 at the ambient pressure port 17 and exerts pressure on the piston base 22.

Reduction in air pressure from the air tank 26 to the second-stage regulator and mouthpiece 27 by operation of the air regulator 1 of this invention is effected in the following manner: The piston spring 16 and ambient water pressure at the ambient pressure port 17, which is defined by the circumferential housing flange 11 in the lower end of the regulator housing 2, normally exert pressure against the piston base 22 to maintain the piston 20 in the uppermost displaced position illustrated in phantom in FIG. 3, such that the rounded top end of the piston 20 abuts the housing cap 10. In this position, the radially-spaced, elliptical access slots 21 are situated such that the upper end of each access slot 21 is contained within the high-pressure chamber 9 and the lower end of the access slots 21 are contained within the intermediate-pressure chamber 12, while the air access slots 21 are spanned by the piston sealing ring 14. Thus, air flows from the high-pressure chamber 9 through the air access slots 21 and into the intermediate pressure chamber 12 at reduced pressure. The resulting increase in air pressure within the intermediate pressure chamber 12 pushes downwardly against the piston base 22, consequently forcing the piston 20 downwardly and sealing the air access slots 21 from the high-pressure chamber 9, since they are now contained entirely within the intermediate-pressure chamber 12. At this point, the air pressure in the intermediate-pressure chamber 12 is substantially equal to the opposing resultant force exerted on the piston base 22 by the sum of the component forces exerted by the piston spring 16 and the ambient water pressure at the diver's diving depth. Upon inhalation of air by the diver, the air pressure is subsequently reduced in the mouthpiece second-stage regulator (not illustrated) and in the air delivery hose 25, so that air is drawn from the intermediate-pressure chamber 12 through one of the four air exit ports 13, each of which may be provided with a quick-disconnect coupling (not illustrated) for attaching separate air delivery hose connections. Air pressure in the intermediate-pressure chamber 12 is consequently reduced and ambient pressure plus spring pressure exert an upward force on the piston base 22 to again move the piston into the uppermost position illustrated in phantom in FIG. 3. During the time period corresponding to exhalation of the diver, high pressure air from the air tank 26 again enters the high pressure chamber 9 and the cycle repeats.

It will be appreciated by those skilled in the art that any desired number of air access slots 21 may be provided in the piston 20. Furthermore, the four air exit ports 13 may connect with four corresponding air delivery hoses 25, each providing air to different auxiliary equipment. While one air delivery hose 25 must necessarily channel air to a second-stage regulator and mouthpiece, another hose could supply air to a power inflator for inflation of a diver's vest and maintaining buoyancy of the diver. Still another hose might connect to a blowgun for blowing sand, etc., from objects in the ocean floor. Another hose could inflate a lift bag designed to float objects from the ocean floor to the surface of the water.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. An air regulator for diving equipment having a mouthpiece, an air delivery hose connected to the mouthpiece, a tank containing compressed air and a tank valve mounted on the tank, said air regulator comprising a regulator housing for mounting on the tank valve; an air entry port provided in one end of said regulator housing for air communication with the compressed air in the tank; a high pressure air chamber provided in said housing in air communication with said air entry port; an intermediate pressure air chamber provided in said regulator housing in intermittent air communication with said high pressure air chamber; at least one air exit port provided in said regulator housing in air communication with said intermediate pressure air chamber for air communication with the air delivery hose; a piston slidably disposed in said regulator housing between said high pressure air chamber and said intermediate pressure air chamber; a coil spring provided in the opposite end of said regulator housing from said one end, said coil spring engaging one end of said piston for urging said piston toward said high pressure air chamber; an ambient pressure port provided in said opposite end of said regulator housing adjacent to said coil spring; at least one slot longitudinally provided in said piston, said at least one slot intermittently communicating with said intermediate pressure air chamber and said high pressure air chamber responsive to reciprocation of said piston in said regulator housing, whereby compressed air entering said air entry port and said high pressure air chamber from the tank and the tank valve flows through said at least one slot in said piston into said intermediate pressure air chamber and on demand through said air exit port into the air delivery hose to the mouthpiece, responsive to slidable travel of said piston in said regulator housing against the bias of said coil spring and ambient water pressure applied to said piston at said ambient pressure port.

2. The air regulator of claim 1 comprising a piston base extending from said one end of said piston in said intermediate pressure air chamber, whereby air from said high pressure air chamber flowing through said at least one slot into said intermediate pressure air chamber exerts pressure on said piston base and slidably displaces said piston in said regulator housing against said coil spring and ambient water pressure at said ambient pressure port.

3. The air regulator of claim 2 wherein said piston comprises an elongated piston having a rounded end extending into said high pressure air chamber and terminating in said piston base.

4. The air regulator of claim 4 wherein said at least one slot comprises at least two slots provided in said piston in spaced relationship with respect to each other.

5. The air regulator of claim 2 wherein:
(a) said piston comprises an elongated piston having a rounded end extending into said high pressure chamber and terminating in said piston base; and
(b) said at least one slot comprises three slots longitudinally provided in said piston in spaced relationship with respect to each other.

6. The air regulator of claim 2 comprising piston base seal means provided in said piston base for slidably engaging said regulator housing and sealing said piston base in said regulator housing.

7. The air regulator of claim 7 wherein said at least one slot comprises at least two slots longitudinally provided in said piston in spaced relationship with respect to each other.

8. The air regulator of claim 7 wherein:
(a) said at least one air exit port comprises a plurality of air exit ports disposed in said regulator housing in spaced relationship with respect to each other; and
(b) said at least one slot comprises three slots longitudinally provided in said piston in spaced relationship with respect to each other.

9. The air regulator of claim 1 wherein said at least one slot comprises at least two slots longitudinally provided in said piston in spaced relationship with respect to each other.

10. The air regulator of claim 1 wherein said at least one air exit port comprises a plurality of air exit ports disposed in said regulator housing in spaced relationship with respect to each other.

11. An air regulator for mounting on the tank valve of a tank containing compressed air and regulating the compressed air to an air delivery hose at a reduced pressure, said air regulator comprising a substantially cylindrical regulator housing for removable attachment to the tank valve; an air entry port provided in one end of said regulator housing for communicating with the compressed air in the tank; a high pressure air chamber provided in said regulator housing in air communication with said air entry port; an intermediate pressure air chamber provided in said regulator housing in air communication with said high pressure air chamber; at least one air exit port provided in said regulator housing in air communication with said intermediate pressure air chamber for air communication with the air delivery hose; an ambient pressure port provided in the opposite end of said regulator housing from said one end; a piston slidably disposed in said regulator housing between said high pressure air chamber and said intermediate air pressure chamber and a piston base projecting from one end of said piston in said intermediate pressure air chamber adjacent to said ambient pressure port; piston seal means provided in said regulator housing between said high pressure air chamber and said intermediate pressure air chamber for engaging and sealing said piston in said regulator housing; a coil spring provided in said opposite end of said regulator housing at said ambient pressure port for engaging said piston base and urging said piston toward said high pressure air chamber; at least two grooves longitudinally provided in said piston, said at least two grooves intermittently communicating with said intermediate pressure air chamber and said high pressure air chamber, whereby compressed air entering said air entry port and said high pressure air chamber from the tank and the tank valve flows through said grooves in said piston into said intermediate pressure air chamber responsive to removal of air from said intermediate pressure air chamber through said air exit port and slidable travel of said piston a predetermined distance against the bias of said coil spring and ambient water pressure at said ambient pressure port.

12. The air regulator of claim 11 wherein said at least two grooves in said piston comprises three grooves provided in said piston in spaced relationship with respect to each other.

13. In an air regulator for mounting on the tank valve of a tank containing compressed air in diving equipment having a mouthpiece connected to an air delivery hose secured to the air regulator, a cylindrical regulator housing and a clamp carried by the regulator housing for removably engaging the tank valve, the improvement comprising an air entry port provided in one end of the regulator housing for communicating with the compressed air in the tank; a high pressure air chamber provided in the regulator housing in air communication with the air entry port; an intermediate pressure air chamber provided in the regulator housing in air communication with said high pressure air chamber; at least one air exit port provided in the regulator housing in air communication with said intermediate pressure air chamber for air communication with the air delivery hose; a cylindrical piston slidably disposed in the regulator housing between said high pressure air chamber and said intermediate pressure air chamber, said piston having a rounded end extending into said high pressure air chamber and an enlarged piston base projecting from the opposite end of said piston in said intermediate pressure air chamber; at least one piston sealing surface provided in the regulator housing between said high pressure air chamber and said intermediate pressure air chamber for engaging and slidably sealing said piston in the regulator housing; at least one piston base sealing surface provided in said piston base for engaging the regulator housing and slidably sealing said piston base in the regulator housing; a coil spring provided in the opposite end of the regulator housing for engaging said piston and urging said piston toward said high pressure air chamber; an ambient pressure port provided in the opposite end of the regulator housing adjacent to said coil spring; and three, substantially equally-spaced, longitudinal slots provided in said piston, said slots normally communicating with said high pressure air chamber and said intermediate pressure air chamber, whereby compressed air entering said air entry port and said high pressure air chamber from the tank and the tank valve flows through said longitudinal slots in said piston into said intermediate pressure air chamber when the compressed air flows through said air exit port on demand from said intermediate pressure air chamber, responsive to reciprocation of said piston and said piston base in said regulator housing.

* * * * *